United States Patent [19]

Rogers

[11] Patent Number: 4,551,732

[45] Date of Patent: Nov. 5, 1985

[54] METHOD AND APPARATUS FOR MODULATING THE RECORDING RATE OF AN IMAGE ON THE RECORDING MEDIA OF A LINE SCAN GRAPHIC RECORDER WITH THE VELOCITY OF THE RECORDING MEDIA

[75] Inventor: Jerrold J. Rogers, Beaverton, Oreg.

[73] Assignee: Tektronix, Inc., Beaverton, Oreg.

[21] Appl. No.: 505,680

[22] Filed: Jun. 20, 1983

[51] Int. Cl.[4] .......................... G01D 9/00; G01D 9/42
[52] U.S. Cl. ................................ 346/110 R; 346/108; 358/300
[58] Field of Search ........................... 346/110 R, 108; 358/296, 300

[56] References Cited

U.S. PATENT DOCUMENTS

| | | | |
|---|---|---|---|
| 3,482,255 | 12/1969 | Baker, Jr. et al. | 346/110 R |
| 3,698,006 | 10/1972 | Oushinsky | 358/300 |
| 3,723,646 | 3/1973 | Behane et al. | 358/300 |
| 3,725,575 | 4/1973 | Dell | 346/110 R X |
| 4,095,235 | 6/1978 | Quarton et al. | 346/110 R |
| 4,172,259 | 10/1979 | Lowe | 346/110 R |
| 4,401,995 | 8/1983 | Sato | 346/110 R |
| 4,412,230 | 10/1983 | Goldberg | 346/110 R |

Primary Examiner—E. A. Goldberg
Assistant Examiner—Patrick W. Foster
Attorney, Agent, or Firm—John H. Bouchard; Robert S. Hulse; Francis I. Gray

[57] ABSTRACT

In a line scan graphic recording apparatus, the beam which displays the data on the recording media must be synchronized with the movement of recording media as it is directed normal to the displaying apparatus. The rate at which the recording media moves in its path is determined by the paper drive means. The rate is often non-uniform due to instantaneous velocity variations of the drive means. A drive velocity sensor produces a timing signal which controls the recording time of the input data image, stored digitally in a buffer memory device, by triggering the buffering device at the appropriate time and causing the image data to be transferred to the display for recording on the selected media.

6 Claims, 1 Drawing Figure

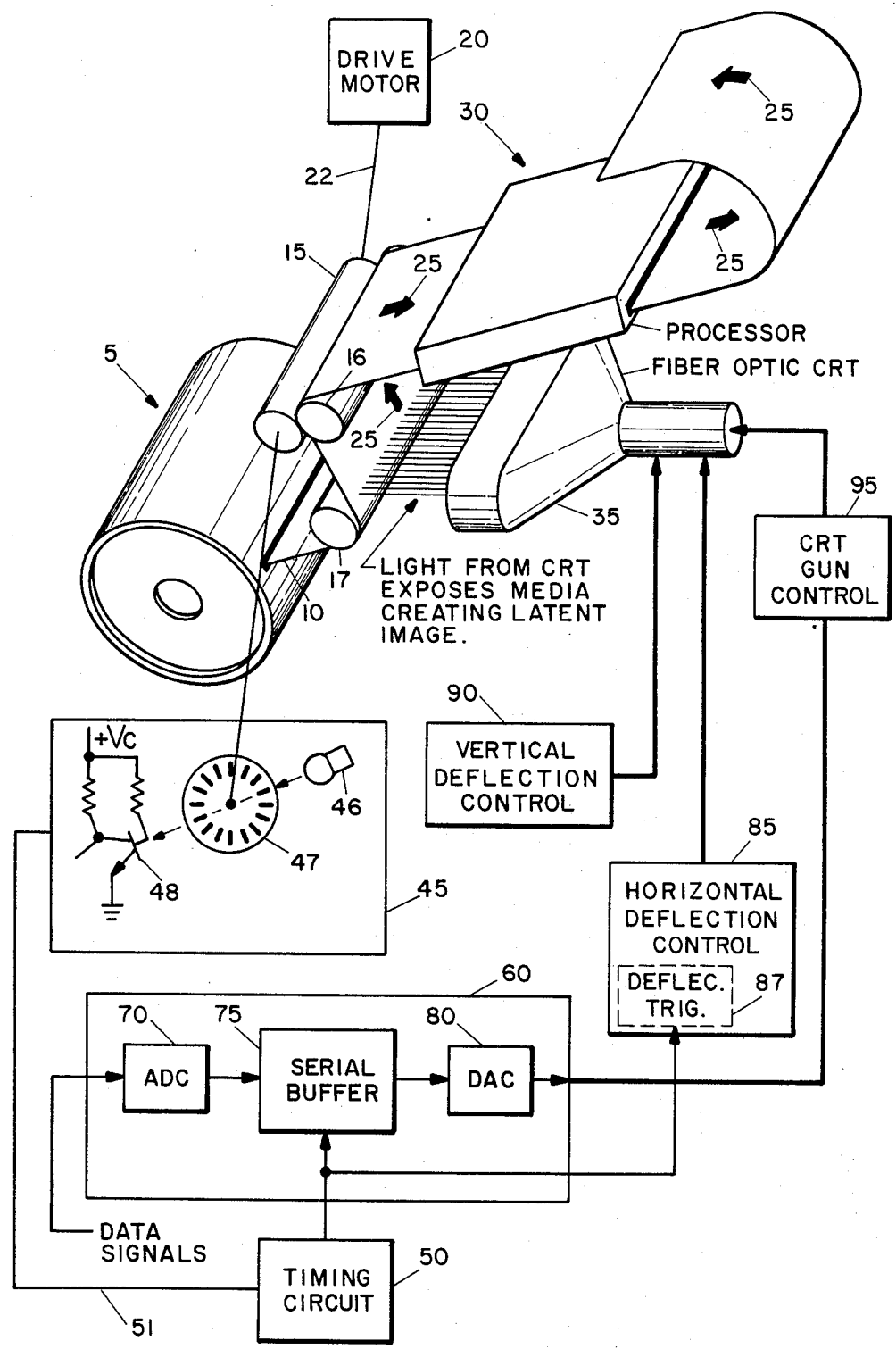

METHOD AND APPARATUS FOR MODULATING THE RECORDING RATE OF AN IMAGE ON THE RECORDING MEDIA OF A LINE SCAN GRAPHIC RECORDER WITH THE VELOCITY OF THE RECORDING MEDIA

BACKGROUND OF THE INVENTION

This invention relates to graphic recording apparatus, more particularly a cathode ray line scan recorder.

In this type of device the light recording medium (e.g. light sensitive film or paper) is moved by mechanical drive rollers, along a path substantially normal to the display medium (e.g. a CRT). The image is recorded on the moving paper as it is exposed by a beam of light from the display medium as a gray scale recorded image.

In many graphic recording devices of this type, the quality and fidelity of this recorded image is dependent upon the constancy of the velocity of the recording medium along its path of travel. The display medium is typically designed to expose the recording medium, a line at a time, at a constant rate based upon an average velocity of the recording medium. Due to the mechanical linkage for moving the recording medium, the velocity of the recording medium is non-uniform. This non-uniformity of motion of the recording medium results in uneven exposure of the recording medium. When the motion of the recording medium is faster, the recorded lines are spaced slightly further apart and the recorded image appears to be lighter; when the motion of the recording medium is slower, the line spacing is closer and the recorded image appears to be darker.

An analog approach to this problem has been disclosed in U.S. Pat. No. 4,172,259. The technique discussed therein requires the constant monitoring of the velocity of the recording by generating a signal representative of that velocity, applying that analog signal to a frequency to voltage converter, differentiating that voltage signal, integrating the differentiator output, and modulating the vertical deflection circuit of the CRT in a compensating direction relative the base or average velocity position as determined by the error signal.

A technique that is digital and only addresses the horizontal scan modulation of the CRT beam would simplify the circuit and the volume of space necessary to properly control the operation of the recorder. It is believed that the present invention is such a device.

SUMMARY OF THE INVENTION

In accordance with the illustrated embodiment, the present invention provides a means for synchronizing the frequency of the recorded lines with the velocity of the recording medium. The invention comprises means for storing the data to be recorded on the recording medium, so that the stored data can be retrieved and displayed when required, a means for monitoring the movement of the recording medium and a circuit for timing the exposure of the recording medium.

The data to be displayed is stored in a memory device. As the velocity of the recording medium increases or decreases, the monitoring device senses the change in velocity, and the timing circuit produces a changing delay time necessary to synchronize the firing of the display beam with the motion of the recording medium. The result is uniform spacing of the recorded lines on the recording medium.

DESCRIPTION OF THE DRAWINGS

The FIGURE shows the features of a typical line scan recorder with the present invention illustrated in block form.

DESCRIPTION OF THE PREFERRED EMBODIMENT

The FIGURE illustrates a line scan recorder with the embodiments of the present invention. The recorder is shown including a fiber optic cathode ray tube 35 as the displaying medium and light sensitive paper 10 as the recording medium.

Operationally, the recording medium 10 is transported from a media supply canister 5, by means of driver rollers 15, 16, and 17 along a path indicated by the directional arrows 25.

Rollers 16 and 17 are idler rollers and roller 15 is driven by drive motor 20 via mechanical linkage 22. Driven roller 15 together with idler 16 form a pinch roller assembly which pulls paper 10 from the media supply canister 5 in the direction of travel indicated by arrows 25 and there is a take-up means (not shown) which continues to draw paper 10 through processor 30.

Drive motor 20 via mechanical linkage 22 causes recording medium 10 to move in the path indicated by arrows 25 at a preselected average velocity. As a result of gear geometry, mechanical tolerance, etc., there are instantaneous variations in the velocity of driven roller 15 and therefore paper 10. The variations in velocity of driven roller 15 are typically cyclical and correspond to the spacing of the gear teeth within mechanical linkage 22.

In ideal operation, paper 10 is drawn past the face of cathode ray tube 35 at a constant speed with the image being painted on paper 10 a line at a time. When the velocity is constant the spacing of the lines recorded on paper 10 is constant. However, when there is a variation in the speed of paper 10 the recorded lines are spaced either too close or too far from each other. To correct this situation it is necessary to add a feedback mechanism for detecting the instantaneous velocity of the paper 10 and using that information to time the application of the data signal for each line of display to the CRT 35 at the appropriate time.

Also shown in the FIGURE is a velocity sensor 45, a data storage circuit 60, a timing circuit 50, a CRT gun control 95, horizontal deflection control 85 and vertical deflection control 90. In this system, vertical deflection control 90 is pre-set to maintain the display signal in substantially a fixed position on the face of CRT 35.

A simplified velocity sensor system 45 is shown here, however any of several known approaches may be utilized. The velocity sensor system 45 is shown including a slotted wheel 47, a light source 46, and a phototransistor 48. Slotted wheel 47 having equally sized and spaced slots is coupled to driven roller 15. In this system the frequency of the output pulses from velocity sensor 45 are directly proportional to the velocity of driven roller 15.

To store the data for each image line to CRT 35, data storage circuit 60 includes an analog-to-digital converter 70 which receives the image line data serially, line by line, and digitizes it. The digital line data is stored in one or more serial buffers 75 on a first in—first out (FIFO) basis. When a pulse is received from the timing circuit 50 it is applied to the appropriate buffer 75 to begin the transfer of the next image line of data to CRT 35. This transfer occurs via digital-to-analog converter 80. Horizontal deflection control 85 is triggered simultaneously with the transfer of data via trigger circuit 87. As the data leaves buffer 75 it is returned to analog form by DAC 80 and then applied to the CRT electron gun of CRT 35 via the CRT gun control circuit 95. As light from the trace on CRT 35 illuminates paper 10 that image will be recorded thereon by virtue of the light sensitivity of paper 10.

To properly time the application of data for each image line, the timing circuit 50 receives instantaneous paper velocity information on line 51 from the velocity sensor system 45. The timing circuit 50 provides some average delay before an image line is transferred to the CRT. The velocity information on line 51 is utilized to modify this average delay in order to produce uniform line spacing on the recording medium 10. As velocity increases which would be represented by higher frequency pulses on line 51, the delay is accordingly decreased causing an increase in the data transfer rate. As the recording medium velocity decreases the delay is accordingly increased causing a decrease in the data transfer rate.

I claim:

1. A method of modulating the recording rate of an image on a recording media, as the media passes a fixed position single line writing means, with the instantaneous velocity of the recording media in a line scan recorder, the method comprising the steps of:
    a. generating a signal having characteristics that are directly proportional to instantaneous variations in the velocity of the recording media;
    b. sequentially storing each line of input data; and
    c. triggering the sequential release of each line of data stored in step b in response to the signal of step a.

2. A method as in claim 1 wherein step b includes the steps of:
    d. converting the input data to digital form; and
    e. storing the converted data of step d in a FIFO buffer.

3. A method as in claim 2 wherein the method further includes the steps of:
    f. converting the released line of data of step c to an analog signal;
    g. triggering the horizontal sweep of the line scan recorder simultaneously with the sequential release of each line of data in step f; and
    h. applying the analog signal of step f to the line scan recorder for display simultaneously with step g.

4. Apparatus for modulating the recording rate of an image on a recording media, as the media passes a fixed position single line writing means, with the instantaneous velocity of the recording media in a line scan recorder, the apparatus comprising:
    first means for generating a signal having characteristics that are directly proportional to instantaneous variations in the velocity of the recording media;
    second means for sequentially storing each line of input data; and
    third means for triggering the sequential release of each line of data stored by the second means in response to the signal generated by the first means.

5. Apparatus as in claim 4 wherein said second means includes:
    an analog to digital converter disposed to receive the input data signals;
    shift register means for storing the output signal of the analog to digital converter in a FIFO string.

6. Apparatus as in claim 5 wherein the apparatus further includes:
    a digital to analog converter coupled to receive each released data line signal from the shift register means;
    fourth means for triggering the horizontal sweep of the line scan recorder in response to the output of the digital to analog converter; and
    fifth means for applying the output of the digital to analog converter to the line scan recorder for display simultaneously with the triggering of the horizontal sweep by the fourth means.

* * * * *